(12) United States Patent
Wang

(10) Patent No.: US 12,395,332 B2
(45) Date of Patent: Aug. 19, 2025

(54) KEY MANAGEMENT METHOD AND APPARATUS

(71) Applicant: Beijing Sursen Information Technology Co., Ltd., Beijing (CN)

(72) Inventor: Donglin Wang, Beijing (CN)

(73) Assignee: Beijing Sursen Information Technology Co., Ltd., Beijing (CN)

( * ) Notice: Subject to any disclaimer, the term of this patent is extended or adjusted under 35 U.S.C. 154(b) by 305 days.

(21) Appl. No.: 18/175,886

(22) Filed: Feb. 28, 2023

(65) Prior Publication Data

US 2023/0208637 A1 Jun. 29, 2023

Related U.S. Application Data

(63) Continuation of application No. PCT/CN2021/115722, filed on Aug. 31, 2021.

(30) Foreign Application Priority Data

Aug. 31, 2020 (CN) .......................... 202010897547.1
Aug. 31, 2020 (CN) .......................... 202010899689.1

(51) Int. Cl.
G06F 21/00 (2013.01)
H04L 9/08 (2006.01)
H04L 9/32 (2006.01)
H04L 9/40 (2022.01)

(52) U.S. Cl.
CPC .......... H04L 9/0894 (2013.01); H04L 9/3226 (2013.01); H04L 63/105 (2013.01)

(58) Field of Classification Search
CPC ... H04L 9/0894; H04L 9/3226; H04L 63/105; H04L 9/088; H04L 63/062; H04L 63/083; G06F 21/00
See application file for complete search history.

(56) References Cited

FOREIGN PATENT DOCUMENTS

CN 102457377 A * 5/2012
CN 111090622 A * 5/2020 ............. G06F 16/16

* cited by examiner

Primary Examiner — Joseph P Hirl
Assistant Examiner — Aayush Aryal
(74) Attorney, Agent, or Firm — Westbridge IP LLC

(57) ABSTRACT

Disclosed are a key management method and a key management apparatus. The method includes: after confirming that a user logs into a digital identity through a first identity authentication mode, acquiring a first character decryption key corresponding to a first character in at least one character of the digital identity; and decrypting, based on the first character decryption key, an encrypted target key stored in the digital identity to obtain a target key, where the target key is used to manage an asset corresponding to the first character. Based on the technical solutions provided in the present application, a user can log into a digital identity through existing identity information and implement asset management without memorizing a cumbersome and complicated key, which provides great convenience for the user.

18 Claims, 5 Drawing Sheets

കെY MANAGEMENT METHOD AND APPARATUS

CROSS-REFERENCE TO RELATED APPLICATIONS

The present application is a continuation application of International Application No. PCT/CN2021/115722, filed on Aug. 31, 2021, which claims priority to Chinese Patent Application No. 202010897547.1, filed on Aug. 31, 2020, and Chinese Patent Application No. 202010899689.1, filed on Aug. 31, 2020. All of the aforementioned patent applications are incorporated herein by reference in their entireties.

TECHNICAL FIELD

The present application relates to the field of encryption technologies, and in particular, to a key management method and a key management apparatus.

BACKGROUND

With the growth of blockchain technologies, more and more investors are coming into contact with digital currency. However, it is often very difficult to remember a key used to manage digital currency due to its large number of digits and irregularity, which hinders popularization of the digital currency. To allow users to keep a key more conveniently and securely, some solutions have emerged on the market in recent years. However, there has never been a solution that can truly relieve users' pressure on key management.

Meanwhile, the Internet of Things is developing at a high speed, and more and more products in daily life are beginning to implement intelligent management. However, various smart products make users need to manage a large number of scattered accounts, which makes users feel inconvenient. If mismanagement occurs, users' assets even have security risks.

SUMMARY

In view of this, to resolve the foregoing problems faced by a user in asset management in the conventional technology, embodiments of the present application provide a key management method and a key management apparatus.

According to a first aspect of the embodiments of the present application, a key management method is provided and includes: after confirming that a user logs into a digital identity through a first identity authentication mode, acquiring a first character decryption key corresponding to a first character in at least one character of the digital identity; and decrypting, based on the first character decryption key, an encrypted target key stored in the digital identity to obtain a target key, where the target key is used to manage an asset corresponding to the first character.

According to a second aspect of the embodiments of the present application, a key management apparatus is provided and includes: a key acquisition module, configured to: after confirming that a user logs into a digital identity through a first identity authentication mode, acquire a first character decryption key corresponding to a first character in at least one character of the digital identity; and a decryption module, configured to decrypt, based on the first character decryption key, an encrypted target key stored in the digital identity to obtain a target key, where the target key is used to manage an asset corresponding to the first character.

According to a third aspect of the embodiments of the present application, a computer device is provided and includes: a process; and a memory, where the memory includes computer instructions stored thereon, and when the computer instructions are executed by the processor, the key management method according to the first aspect is implemented.

According to a fourth aspect of the embodiments of the present application, a computer-readable storage medium is provided and includes computer instructions stored thereon, and the computer instructions, when executed by a processor, cause the processor to perform the key management method according to the first aspect.

The key management method and the key management apparatus provided in the embodiments of the present application at least include the following effects.

A user can log into a digital identity through existing identity information and implement asset management without memorizing a cumbersome and complicated key, which provides great convenience for the user. In addition, risks of key leakage or loss are eliminated, so that the user does not need to worry whether a key keeping manner is secure, and asset security of the user can be guaranteed to a great extent.

It should be understood that, the description of the foregoing technical effects is merely exemplary and explanatory, and does not constitute a limitation on the present application.

DETAILED DESCRIPTIONS OF THE EMBODIMENTS

The following clearly describes the technical solutions in the embodiments of the present application with reference to the accompanying drawings in the embodiments of the present application. Apparently, the described embodiments are merely some but not all of the embodiments of the present application. All other embodiments obtained by persons of ordinary skill in the art based on the embodiments of the present application belong to the protection scope of the present application.

Overview

As described above, in the current environment where the Internet is rapidly developing and popularizing, a user needs to manage his or her assets through various account passwords or keys. However, there are so many products and platforms that make people dizzy, an account password that is not commonly used is easy to forget, and a key is long and difficult to remember, which is very difficult to manage.

For the foregoing technical problems, a basic concept of the present application is to propose a key management method and a key management apparatus, in which a digital identity is introduced in a key management system, and a cryptography method is used to enable a digital identity to replace a user to manage assets, which is not only very convenient, but also can guarantee asset security of the user to a great extent. According to the key management system provided in the present application, the user can properly manage his or her assets by only managing the digital identity, which greatly reduces pressure on the user and saves a lot of energy for the user.

Exemplary System

Figure 1:
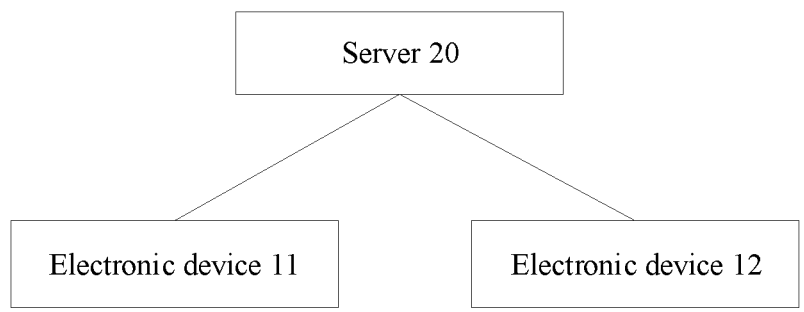
FIG. 1 is a schematic diagram of a system architecture of a key management system according to an exemplary embodiment of the present application.

FIG. 1 is a schematic diagram of a system architecture of a key management system according to an exemplary embodiment of the present application. As shown in FIG. 1, the key management system includes an electronic device 11, an electronic device 12 and a server 20.

The electronic device may be a mobile device such as a mobile phone, a game console, a tablet computer, a camera, a video camera, or a vehicle-mounted computer; or may be a computer, such as a notebook computer, or a desktop computer; or may be another electronic device including a processor and a memory. A type of the electronic device is not limited in the embodiments of the present application.

The electronic device 11 acquires authorization of a user through a first identity authentication mode to generate a first authentication encryption key, encrypts a character decryption key based on the first authentication encryption key, and saves an encrypted character decryption key to the server 20, to implement a creation process of the digital identity. Further, the electronic device 12 may implement a process of managing or using the character decryption key by acquiring the encrypted character decryption key from the server 20 and performing decryption on the encrypted character decryption key. Specifically, in practical applications, the foregoing process may be performed by a client installed on the electronic device 11 and/or the electronic device 12. It should be understood that, in some embodiments, the electronic device 11 and the electronic device 12 may be a same electronic device.

The server 20 is disposed on the Internet and configured to establish a communication connection with an electronic device and receive and execute instructions from the electronic device, and/or receive and save data from the electronic device.

It should be noted that, the foregoing application scenario is merely illustrated to facilitate understanding the spirit and principles of the present application, and the embodiments of the present application are not limited thereto. On the contrary, the embodiments of the present application may be applied to any scenario that may be applicable.

Exemplary Methods

Figure 2:
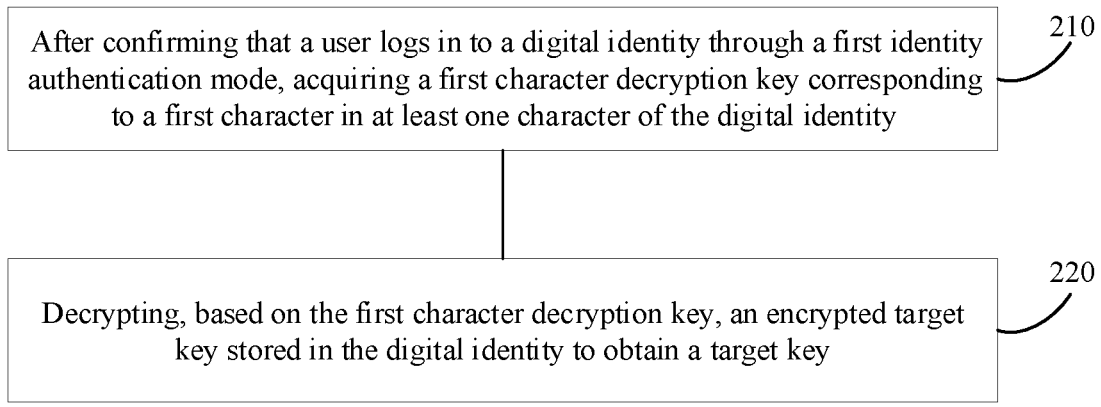
FIG. 2 is a schematic flowchart of a key management method according to an exemplary embodiment of the present application.

FIG. 2 is a schematic flowchart of a key management method according to an exemplary embodiment of the present application. The method may be implemented by a client on the electronic device 12. As shown in FIG. 2, the method may include the following steps.

S210: after confirming that a user logs into a digital identity through a first identity authentication mode, acquiring a first character decryption key corresponding to a first character in at least one character of the digital identity.

Specifically, a user may have at least one identity authentication mode having permission to log into the digital identity, which includes the first identity authentication mode. Herein, the identity authentication mode is used to prove that the user has permission to log into the digital identity.

Further, a digital identity may be associated with only one identity authentication mode, or may be associated with a plurality of identity authentication modes. The plurality of identity authentication modes may correspond to a same user, or may correspond to a plurality of different users. In practical applications, the client may display, to the user in a form of a list or the like, all identity authentication modes available for the user, so that the user may perform selection; or automatic selection may be performed through fingerprint recognition, face recognition, or card swiping. When the user chooses to perform login through the first identity authentication mode, the client performs identity authentication on the user through the first identity authentication mode and allows the user to log into the digital identity after the authentication succeeds.

In an embodiment, the digital identity may correspond to a natural person, a virtual identity, or an organization. In other words, all natural persons, virtual identities, or organizations may hold at least one digital identity, which is used to manage assets for which they have management permission. For example, a company A, as an organization, has a company A digital identity; and an employee B of the company A, as a natural person, has a B digital identity. In addition, B has also created a virtual identity C, and has a C digital identity. Herein, a holder of the digital identity is not limited in the embodiments of the present application.

In another embodiment, a user may have permission to log into a plurality of digital identities, and then may manage assets that are corresponding to the plurality of digital identities. For example, a user may log into his or her digital identity, and a digital identity of a company to which the user belongs, and may also log into a digital identity of a virtual identity. Herein, a quantity of digital identities to which a user can correspond is not limited in the embodiments of the present application.

Further, when a user has permission to log into a plurality of digital identities, at least one identity authentication mode of the user may be set to be corresponding to the plurality of digital identities to which the user has permission to log into. In other words, the user may log into the plurality of digital identities through at least one identity authentication mode, and then may manage assets that are corresponding to the plurality of digital identities.

It should be understood that, the term "user" used in the present application is not limited to a natural person, but may also include, for example, a machine, a monkey, a virtual identity, and an organization. A real identity of the user is not limited in the present application.

The at least one identity authentication mode may be a mode of authenticating an identity of a user through one piece of existing information of the user, where the existing information of the user may include all existing authentication modes held by the user, such as a third-party platform account, a terminal system account, a mobile phone number account, an identity authentication chip, a digital certificate, a proprietary storage space account, a key, and a password that are held by the user, and a human biological feature of the user. The third-party platform account may be a social platform account, a shopping platform account, a financial platform account, a network service account, an intelligent Internet of Things platform account or the like held by the user, for example, a WeChat account, a Taobao account, or a mobile banking account. It should be understood that, a specific type of existing information of a user is not limited in the embodiments of the present application.

After confirming that the user logs into the digital identity, the client may acquire the first character decryption key corresponding to the first character of the digital identity. Specifically, when confirming that the user is a user having login permission, the client may acquire the first character decryption key of the digital identity based on information of the user.

S220: decrypting, based on the first character decryption key, an encrypted target key stored in the digital identity to obtain a target key.

The target key is used to manage an asset corresponding to the first character.

Specifically, the digital identity may have at least one asset, such as a digital currency account, and accounts of various login modes. Each asset has at least one corresponding target key, and the at least one target key is used to manage a corresponding asset, for example, may represent ownership, a use right, a viewing right, or another right to the asset.

In addition, a digital identity may include at least one character, and the at least one character includes a first character. The at least one character is used to manage an asset held by the digital identity, and different characters correspond to different assets of the digital identity. Specifically, when a digital identity has only one character, namely, a first character, the first character may have management permission for all assets held by the digital identity. When a digital identity includes a plurality of characters, different characters in the plurality of characters may separately have management permission for different assets in the assets held by the digital identity. Assets corresponding to two different characters may be partially the same, or may be completely different. For example, a digital identity may include a first character, a second character, and a third character, where the first character has permission to manage a WeChat account, a Weibo account, and a bus card, the second character has permission to manage a smart door lock and a digital currency account, and the third character has permission to manage a WeChat account and a smart door lock.

Based on the key management method provided in the embodiments of the present application, different characters are set in a digital identity, and different asset management permission is assigned to different characters, so that assets can be divided according to a user's needs or a security level to improves convenience of a key management system, and the user can manage the assets more conveniently.

Further, the at least one character each has a corresponding character key, and the character key may include a pair of character encryption key and character decryption key that are corresponding to each other. For example, the first character corresponds to a first character encryption key and a first character decryption key. When management permission for at least one asset is granted to a character, a character encryption key corresponding to the character may be used to separately encrypt at least one target key corresponding to at least one asset that is within the management permission, to obtain at least one encrypted target key, and save the at least one encrypted target key to the digital identity. For example, a first character encryption key is used to encrypt a target key of an asset corresponding to the first character, to obtain an encrypted target key. In this way, when the client acquires a character decryption key, the character decryption key may be used to decrypt the encrypted target key, to obtain the target key. It should be understood that, the character encryption key and the character decryption key may be a pair of asymmetric keys, such as a public key and a private key, or may be a symmetric key, which is not limited in the present application.

Preferably, in another embodiment, after obtaining the target key, the client may further implement, by using the target key and according to an instruction from a user, management of an asset corresponding to the target key. For example, when the target key is a key of a digital currency account, the user may issue an operation instruction to check balance of the digital currency account. After receiving the operation instruction, the client may find a corresponding encrypted target key, and use a first character decryption key to decrypt the encrypted target key to obtain the target key and execute the operation instruction issued by the user.

Based on the key management method provided in the embodiments of the present application, a user can log into a digital identity through existing identity information and implement asset management without memorizing a cumbersome and complicated key, which provides great convenience for the user. In addition, the key management method provided in the embodiments of the present application eliminates risks of key leakage or loss, so that the user does not need to worry whether a key keeping manner is secure, and asset security of the user can be guaranteed to a great extent.

In an embodiment, the digital identity may further include a plurality of permission levels, and each permission level in the plurality of permission levels has permission to manage an asset corresponding to at least one character in the plurality of characters.

Specifically, each identity authentication mode in all identity authentication modes that are corresponding to a digital identity has a permission level, and thus has asset management permission of at least one character corresponding to the permission level. For example, a first identity authentication mode may correspond to a first permission level in the plurality of permission levels, the first permission level may have permission to manage the asset corresponding to the first character, and then a user logging into the digital identity through the first identity authentication mode can manage the asset corresponding to the first character; and a second identity authentication mode may correspond to a second permission level in the plurality of permission levels, the second permission level may have permission to manage the asset corresponding to the first character and an asset corresponding to the second character, and then a user logging into the digital identity through the second identity authentication mode can manage both the asset corresponding to the first character and the asset corresponding to the second character.

In practical applications, each identity authentication mode may have a corresponding authentication key, and the authentication key may include a pair of authentication encryption key and authentication decryption key that are corresponding to each other. For example, the first identity authentication mode may correspond to a first authentication encryption key and a first authentication decryption key.

When a specific permission level needs to be granted to an identity authentication mode, for example, when the first permission level is granted to the first identity authentication mode, the first authentication encryption key may be used to encrypt a first character decryption key corresponding to the first permission level, to obtain an initially encrypted first character decryption key. In this way, when a user logs into the digital identity through the first identity authentication mode, the client may acquire the first authentication decryption key, find the initially encrypted first character decryption key, and decrypt the initially encrypted first character decryption key by using the first authentication decryption key, to obtain the first character decryption key.

For another example, when the second permission level is granted to the second identity authentication mode, a second authentication encryption key may be used to separately encrypt a first character decryption key and a second character decryption key that are corresponding to the second permission level, to obtain an initially encrypted first character decryption key and an initially encrypted second character decryption key. Similarly, when a user logs into the digital identity through the second identity authentication mode, the client may acquire a second authentication decryption key, find the initially encrypted first character decryption key and/or the initially encrypted second character decryption key according to the user's needs, and use the second authentication decryption key to decrypt the initially encrypted first character decryption key and/or the initially encrypted second character decryption key, to obtain the first character decryption key and/or the second character decryption key.

It should be understood that, the authentication encryption key and the authentication decryption key may be a pair of asymmetric keys, such as a public key and a private key, or may be a symmetric key, which is not limited in the present application.

It should be understood that, a specific division and corresponding modes of assets, characters, and permission levels may be set by those skilled in the art according to actual needs, or may be customized in the system by a user, which is not limited in the embodiments of the present application.

Based on the key management method provided in the embodiments of the present application, on the basis of helping a user to perform key management, different identity authentication modes can respectively have different levels of asset management permission by setting a permission level, so that performance of a key management system is more comprehensive and complete, bringing convenience to the user, and further improving security of assets of the user.

Figure 3:
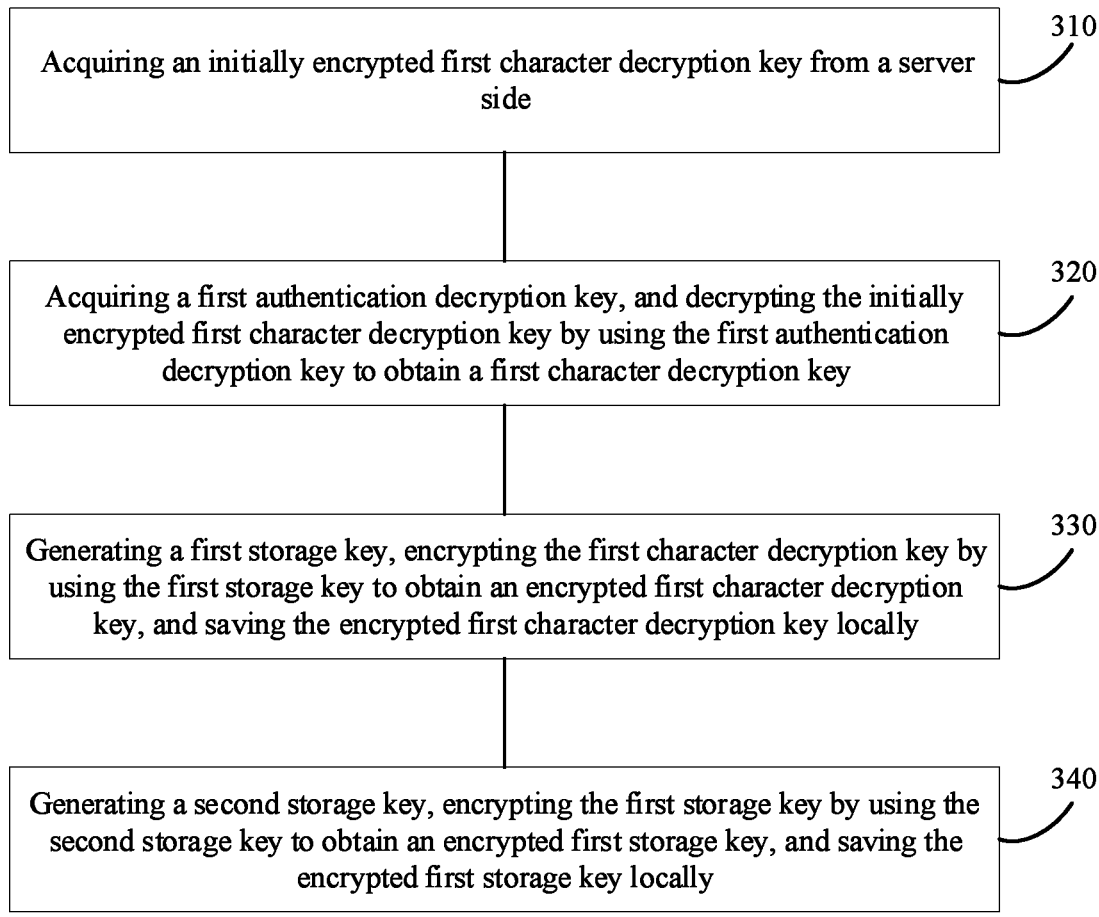
FIG. 3 is a schematic flowchart of a key management method according to another exemplary embodiment of the present application.

FIG. 3 is a schematic flowchart of a key management method according to another exemplary embodiment of the present application. This method may be performed by a client on an electronic device 12 (hereinafter referred to as a login client).

In the method illustrated in FIG. 3, when a user uses a new electronic device, before a first identity authentication mode is used to log into a digital identity for the first time, the first identity authentication mode may be bound to the electronic device. The method may include the following steps.

S310: acquiring an initially encrypted first character decryption key from a server side.

When the user chooses to bind the first identity authentication mode with the login client, the login client may acquire the initially encrypted first character decryption key corresponding to the first identity authentication mode from the server side.

It should be noted that, when the user creates the first identity authentication mode for the digital identity, at least one character of the digital identity may be selected to be associated with the first identity authentication mode. After receiving an instruction from the user, a client on an electronic device 11 (hereinafter referred to as a creation client) may grant management permission for an asset corresponding to the at least one character to the first identity authentication mode.

Specifically, in an embodiment, when the user selects a first character as a corresponding character of the first identity authentication mode, the creation client may generate a first authentication encryption key corresponding to the first identity authentication mode when creating the first identity authentication mode, encrypt a first character decryption key by using the first authentication encryption key to generate the initially encrypted first character decryption key, and save the initially encrypted first character decryption key on the server side. Preferably, in another embodiment, the creation client may generate a pair of asymmetric keys that are corresponding to the first identity authentication mode, and use the private key as the first authentication encryption key, and the public key as the first authentication decryption key. It should be understood that, a specific manner of generating an authentication key is not limited in the embodiments of the present application.

S320: acquiring a first authentication decryption key, and decrypting the initially encrypted first character decryption key by using the first authentication decryption key to obtain the first character decryption key.

After acquiring the initially encrypted first character decryption key, the login client may further acquire the first authentication decryption key, so that the initially encrypted first character decryption key is decrypted to obtain the first character decryption key.

In a preferred embodiment, the first authentication decryption key may be saved on the server side in an encrypted form. For example, when the first identity authentication mode is created, the creation client may generate a third storage key, encrypt the first authentication decryption key by using the third storage key, and save the encrypted first authentication decryption key on the server side. Therefore, a process of acquiring the first authentication decryption key may include: acquiring an encrypted first authentication decryption key from the server side; and acquiring the third storage key and decrypting the encrypted first authentication decryption key by using the third storage key to obtain the first authentication decryption key.

It should be understood that, the login client may simultaneously acquire the initially encrypted first character decryption key and the encrypted first authentication decryption key from the server side, or may first acquire the encrypted first authentication decryption key and then acquire the initially encrypted first character decryption key, which is not limited in the embodiments of the present application.

Further, in an embodiment, to reduce a leakage risk of the third storage key, the third storage key may be generated based on the first identity authentication mode, or the third storage key may be associated with the first identity authentication mode and then saved, so that the login client can acquire the third storage key only when the user logs into the digital identity through the first identity authentication mode. Herein, manners of generating the third storage key by the creation client may be different depending on a type of the first identity authentication mode. Correspondingly, manners of acquiring the third storage key by the login client may also be different depending on different generation manners.

For example, when the first identity authentication mode is a third-party platform account, the login client may send a verification request to a first identity authentication terminal corresponding to the third-party platform account and then acquire first identity authentication information. After receiving the verification request, the first identity authentication terminal may perform identity verification on the user. After the verification succeeds, the first identity authentication terminal may send the first identity authentication information including identity information of the user to the login client, so that the login client calculates the third storage key based on the first identity authentication information. For example, when the first identity authentication mode is WeChat, a WeChat authentication terminal may send a WeChat ID of the user to the login client after verification of the identity of the user succeeds, and the login client may calculate the third storage key based on the WeChat ID of the user.

For another example, the first identity authentication mode may alternatively be an identity authentication chip capable of interacting with the login client. In this case, the login client may directly read the first identity authentication information including identity information of the user from the identity authentication chip and calculate the third storage key.

For another example, the first identity authentication mode may alternatively be a mode of authenticating a human biological feature of the user. In this case, the login client may acquire the human biological feature of the user, extract the first identity authentication information from the human biological feature, and calculate the third storage key.

In another embodiment, a process that the login client acquires the third storage key may include: acquiring first identity authentication information through the first identity authentication mode; acquiring a first salt value from the server side; and calculating the third storage key based on the first identity authentication information and the first salt value (for example, a random value used in an encryption process). The creation client may generate the first salt value for calculating the third storage key when creating the first identity authentication mode and save the first salt value on the server side.

In another embodiment, the process that the login client acquires the third storage key may include: acquiring first identity authentication information through the first identity authentication mode; acquiring personal information of the user; acquiring a first salt value from the server side; and calculating the third storage key based on the first identity authentication information, personal information of the user, and the first salt value. The login client may present a personal information input request to the user through a user interface, and receive personal information input by the user. For example, the personal information of the user may be a name of a parent of the user.

In another embodiment, the third storage key may be pre-generated and saved locally, and have an association relationship with the first identity authentication mode. The login client may locally acquire the third storage key associated with the first identity authentication mode after confirming that the user logs into the digital identity through the first identity authentication mode.

In another implementation of the foregoing embodiments, when the first identity authentication mode has a corresponding cloud service account, the third storage key may alternatively be pre-generated and saved on a cloud corresponding to the first identity authentication mode. After confirming that the user logs into the digital identity through the first identity authentication mode, the login client may acquire the third storage key from the cloud corresponding to the first identity authentication mode.

Optionally, the login client may establish a secure connection with the server side before acquiring the encrypted first authentication decryption key from the server side. For example, the login client may establish the secure connection with the server side through a relatively high-security means such as a private key negotiation algorithm, so as to ensure data security during communication.

Based on the key management method provided in the embodiments of the present application, an authentication key is kept in an encrypted form, and a user is required to verify a corresponding identity authentication mode during decryption, so that a character key can be kept more securely, thereby improving asset security of the user.

Optionally, in another embodiment, the server side may be provided with a key database, and the encrypted first authentication decryption key may be saved in the key database. A process of acquiring the encrypted first authentication decryption key from the server side may include: acquiring a first login account number and a first login password based on the first identity authentication mode; logging into the key database by using the first login account number and the first login password; and acquiring the encrypted first authentication decryption key from the key database.

Specifically, when creating the first identity authentication mode, the creation client may send an account creation request to the server side, so that the server side creates a first key database account for logging into the key database. The first key database account is corresponding to the first identity authentication mode and used to save the encrypted first authentication decryption key. Herein, the first key database account may have a pair of account number and password, namely first login account number and first login password, and the login client may log into the key database based on the first login account number and the first login password and acquire data from the key database. It should be understood that, the first login account number and the first login password may be generated by the creation client and sent to the server side, or may be directly generated on the server side, which is not limited in the embodiments of the present application.

When acquiring the first login account number and the first login password based on the first identity authentication mode, the creation client may calculate the first login account number and the first login password based on the first identity authentication mode, or may acquire the pre-stored first login account number and first login password by logging on the cloud corresponding to the first identity authentication mode, or may directly acquire the first login account number and the first login password that are associated with the first identity authentication mode locally. It should be understood that, a specific manner of generating and saving the first login account number and the first login password is not limited in the embodiments of the present application.

When acquiring the first login account number and the first login password based on the first identity authentication mode, the login client may calculate the first login account number and the first login password based on the first identity authentication mode, or may acquire the pre-stored first login account number and first login password by logging on the cloud corresponding to the first identity authentication mode, or may directly acquire the first login account number and the first login password that are associated with the first identity authentication mode locally. It should be understood that, a manner of acquiring the first login account number and the first login password may correspond to a manner of generating the first login account number and the first login password during creation of the first identity authentication mode, and specific manners of generating, acquiring and storing the first login account number and the first login password are not limited in the embodiments of the present application.

Based on the key management method provided in the embodiments of the present application, an authentication key may be kept in an encrypted form, and a database account may also be created on the server side to better keep the authentication key and further strengthen security of a key management system, so that asset security of a user can be guaranteed to a great extent.

S330: generating a first storage key, encrypting the first character decryption key by using the first storage key to obtain an encrypted first character decryption key, and saving the encrypted first character decryption key locally.

After obtaining the first character decryption key based on decryption, to be capable of securely saving the first character decryption key locally, the creation client may generate the first storage key based on the first identity authentication mode, encrypt the first character decryption key by using the first storage key, and save the encrypted first character decryption key locally. Specifically, to reduce a leakage risk of the first storage key, the first storage key may be generated based on the first identity authentication mode, or the generated first storage key may be associated with the first identity authentication mode for storage, so that the login client can acquire the first storage key only when the user logs into the digital identity through the first identity authentication mode. For example, the creation client may calculate the first storage key based on the first identity authentication information, or the creation client may randomly generate a first storage key and save the first storage key on a cloud corresponding to the first identity authentication mode or associate the first storage key with the first identity authentication mode and then save the first storage key locally.

In an embodiment, a process that the creation client generates the first storage key may include: acquiring the first identity authentication information through the first identity authentication mode; and performing a calculation based on the first identity authentication information to obtain the first storage key corresponding to the first identity authentication mode. It should be understood that, a specific manner that the creation client calculates the first storage key based on the first identity authentication information may be set by those skilled in the art according to actual needs, which is not limited in the embodiments of the present application.

Herein, according to different types of the first identity authentication mode, manners that the creation client acquires the first identity authentication information may also be different.

For example, the first identity authentication mode may be a third-party platform account. When the user chooses to bind the first identity authentication mode on a creation client device, the creation client may send a verification request to a first identity authentication terminal corresponding to the third-party platform account, and then acquire the first identity authentication information. After receiving the verification request, the first identity authentication terminal may perform identity verification on the user. After the verification succeeds, the first identity authentication terminal may send the first identity authentication information including identity information of the user to the creation client, so that the creation client calculates the first storage key based on the first identity authentication information. For example, when the first identity authentication mode is WeChat, a WeChat authentication terminal may send a WeChat ID of the user to the creation client after verification of the identity of the user succeeds, and the creation client may calculate the first storage key based on the WeChat ID of the user.

For another example, the first identity authentication mode may alternatively be an identity authentication chip capable of interacting with the creation client, and the first identity authentication information including identity information of the user may be saved in the identity authentication chip. In this case, the creation client may directly read the first identity authentication information including identity information of the user from the identity authentication chip and calculate the first storage key.

For another example, the first identity authentication mode may alternatively be a mode of authenticating a human biological feature of the user. Therefore, the first identity authentication information may be generated based on a human biological feature of the user (such as a fingerprint feature, a facial feature, an iris feature, or a voice feature). In this case, the creation client may acquire the human biological feature of the user, extract the first identity authentication information from the human biological feature, and calculate the first storage key.

It should be understood that, a specific form of identity authentication information and a specific manner of acquiring the identity authentication information are not limited in the present application, as long as the identity authentication information is non-public information that can be acquired after identity authentication succeeds and can verify an identity of a user.

Optionally, in another embodiment, the process that the creation client generates the first storage key may include: acquiring the first identity authentication information through the first identity authentication mode; randomly generating a first salt value or acquiring a first salt value from the server side; and calculating the first storage key based on the first identity authentication information and the first salt value. Specifically, the creation client may generate a random number as the first salt value, or may acquire a pre-stored first salt value from the server side. For example, the first salt value may be generated and saved on the server side during creation of the first identity authentication mode. The server side may be provided with an ID database, a first authentication record corresponding to the first identity authentication mode is stored in the ID database, and the first salt value may be saved in the first authentication record. In this case, each identity authentication mode of each user may correspond to a unique number, and different numbers correspond to different authentication records in the ID database. When the user chooses to bind the first identity authentication mode to a new mobile terminal, the creation client may find the first authentication record on the server side based on the first identity authentication mode, so as to acquire the first salt value. It should be understood that, the first salt value may be randomly generated, or may be generated based on information such as the first identity authentication mode and/or personal information of the user, and a specific process of generating the first salt value is not limited in the embodiments of the present application.

Preferably, in another embodiment, the process that the creation client generates the first storage key may include: acquiring the first identity authentication information through the first identity authentication mode; acquiring personal information of a user; randomly generating a first salt value or acquiring a first salt value from the server side; and calculating the first storage key based on the first identity authentication information, the personal information of the user, and the first salt value. The creation client may present a personal information input request to the user through a user interface, and receive personal information input by the user. For example, the personal information of the user may be a name of a parent of the user.

In another embodiment, the creation client may alternatively generate the first storage key randomly, and associate the first storage key with the first identity authentication mode and then save the first storage key locally. Preferably, the creation client may alternatively save the first storage key directly on a cloud corresponding to the first identity authentication mode. For example, when the first identity authentication mode has a corresponding cloud service account, the creation client may establish a communication connection with the cloud service account, and save the first storage key in the cloud service account.

Based on the key management method provided in the embodiments of the present application, an identity authentication mode specified by a user is bound locally, so that when logging into the digital identity in daily life, the user can acquire data and perform key management locally without needing to interact with a server side, thereby implementing decentralization to some extent and further improving security of key management.

Preferably, in another embodiment, the key management method illustrated in FIG. 3 may further include the following contents.

S340: generating a second storage key, encrypting the first storage key by using the second storage key to obtain an encrypted first storage key and saving the encrypted first storage key locally.

Specifically, to further reduce a risk that the first character decryption key is stolen, the creation client may further generate the second storage key, which is used to encrypt the first storage key to improve a security degree of the first storage key, thereby further improving a security degree of the first character decryption key.

In an embodiment, the creation client may randomly generate the second storage key and then save the second storage key on a cloud corresponding to the first identity authentication mode, or associate the second storage key with the first identity authentication mode and then save the second storage key locally. Preferably, in another embodiment, the creation client may obtain the second storage key through calculation based on the first identity authentication information, or based on the first identity authentication information and the first salt value. It should be understood that, a manner that the creation client calculates the second storage key based on the first identity authentication information may be the same as or similar to the foregoing manner of generating the first storage key, and details are not described herein again.

It should be understood that, a specific manner of encrypting the first character decryption key may be set by those skilled in the art according to actual needs, for example, more relevant data may be added for calculation, to further increase a number of encryption layers, which is not limited in the embodiments of the present application.

Based on the key management method provided in the embodiments of the present application, an identity authentication mode specified by a user is bound locally, and multiple encryption is performed on a character key, thereby optimizing a storage manner of the character key, and further improving security of key management.

Figure 4:
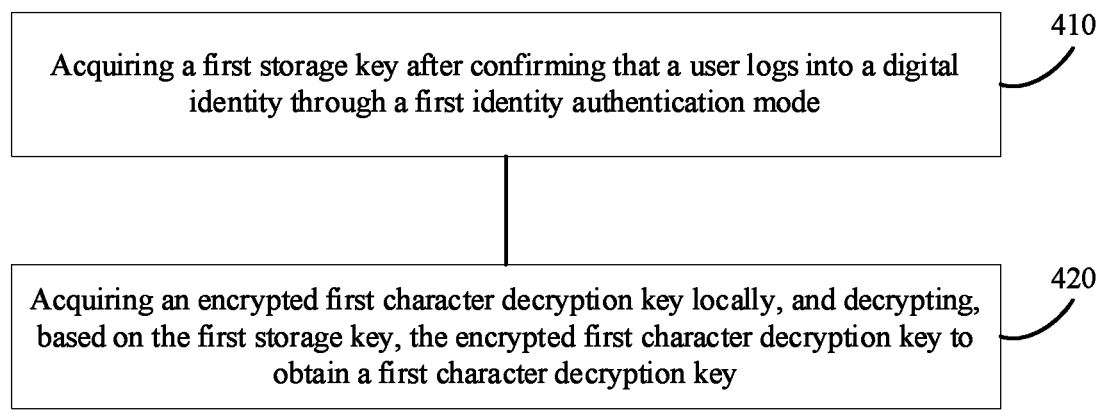
FIG. 4 is a schematic flowchart of a key management method according to another exemplary embodiment of the present application.

FIG. 4 is a schematic flowchart of a key management method according to another exemplary embodiment of the present application. The method may be performed by a client.

After a first identity authentication mode has already been bound to a login client, when a user routinely logs into a digital identity through the first identity authentication mode, the login client may perform the key management method illustrated in FIG. 4, and the method may include the following steps.

S410: acquiring a first storage key after confirming that the user logs into the digital identity through the first identity authentication mode.

Specifically, the login client may acquire the first storage key through the first identity authentication mode after confirming that the user has permission to log into the digital identity and learning that a login mode of the user is the first identity authentication mode. It should be understood that, a specific manner that the login client acquires the first storage key may correspond to a manner that the creation client generates the first storage key in the method illustrated in FIG. 3.

In an embodiment, a process that the login client acquires the first storage key may include: acquiring first identity authentication information through the first identity authentication mode; and performing a calculation based on the first identity authentication information to obtain the first storage key corresponding to the first identity authentication mode.

Herein, according to different types of the first identity authentication mode, manners that the login client acquires the first identity authentication information may also be different.

For example, when the first identity authentication mode is a third-party platform account, the user logs into the digital identity by logging into the third-party platform account. After confirming that the user logs into the digital identity, the login client may send a verification request to a first identity authentication terminal corresponding to the third-party platform account, and then acquire the first identity authentication information. After receiving the verification request, the first identity authentication terminal may perform identity verification on the user. After the verification succeeds, the first identity authentication terminal may send the first identity authentication information including identity information of the user to the login client, so that the login client calculates the first storage key based on the first identity authentication information. For example, when the first identity authentication mode is WeChat, a WeChat authentication terminal may send a WeChat ID of the user to the login client after verification of the identity of the user succeeds, and the login client may calculate the first storage key based on the WeChat ID of the user.

For another example, the first identity authentication mode may alternatively be an identity authentication chip capable of interacting with the login client. During login of the user to the digital identity, the identity authentication chip may interact with the login client, and thus the user logs into the digital identity. In this case, the login client may directly read the first identity authentication information including identity information of the user from the identity authentication chip and calculate the first storage key.

For another example, the first identity authentication mode may alternatively be a mode of authenticating a human biological feature of the user, and the user may log into the digital identity through a human biological feature identification mode such as fingerprint recognition, facial recognition, iris recognition, and voice recognition. After confirming that the user logs into the digital identity, the login client may acquire the human biological feature of the user, extract the first identity authentication information from the human biological feature, and calculate the first storage key.

In another embodiment, the process that the login client acquires the first storage key may include: acquiring the first identity authentication information through the first identity authentication mode; acquiring a first salt value locally; and calculating the first storage key based on the first identity authentication information and the first salt value. When binding the first identity authentication mode to a login client device, the login client may locally save the first salt value randomly generated or acquired from a server side.

In another embodiment, the process that the login client acquires the first storage key may include: acquiring the first identity authentication information through the first identity authentication mode; acquiring personal information of the user; acquiring a first salt value locally; and calculating the first storage key based on the first identity authentication information, the personal information of the user, and the first salt value. The login client may present a personal information input request to the user through a user interface, and receive personal information input by the user. For example, the personal information of the user may be a name of a parent of the user.

In another embodiment, the first storage key may be pre-generated and saved locally, and have an association relationship with the first identity authentication mode. The login client may locally acquire the first storage key associated with the first identity authentication mode after confirming that the user logs into the digital identity through the first identity authentication mode.

In another implementation of the foregoing embodiments, when the first identity authentication mode has a corresponding cloud service account, the first storage key may alternatively be pre-generated and saved on a cloud corresponding to the first identity authentication mode. After confirming that the user logs into the digital identity through the first identity authentication mode, the login client may acquire the first storage key from the cloud corresponding to the first identity authentication mode.

Based on the key management method provided in the embodiments of the present application, without needing to interact with a server side, a user can log into a digital identity with existing identity information, so that there is no need to memorize a cumbersome and complicated key, and asset management is easily implemented. In addition, risks of key leakage or loss is eliminated, which provides great convenience for the user, and asset security of the user can be guaranteed to a great extent.

Optionally, in another embodiment, the process that the login client acquires the first storage key may include: acquiring a second storage key; and acquiring an encrypted first storage key locally, and decrypting the encrypted first storage key based on the second storage key to obtain the first storage key.

Specifically, to further reduce a risk that a first character decryption key is stolen, the first storage key may be further saved locally in an encrypted form after being encrypted by the second storage key.

In an embodiment, the login client may locally acquire a second storage key associated with the first identity authentication mode, or may acquire a second storage key from a cloud corresponding to the first identity authentication mode. Preferably, in another embodiment, the login client may obtain the second storage key through calculation based on the first identity authentication information, or based on the first identity authentication information and the first salt value. It should be understood that, a manner that the login client acquires the second storage key may correspond to the manner of generating the second storage key described above, and details are not described herein again.

S420: acquiring an encrypted first character decryption key locally, and decrypting, based on the first storage key, the encrypted first character decryption key to obtain the first character decryption key.

Based on the key management method provided in the embodiments of the present application, multiple encryption is performed on a character key, thereby optimizing a storage manner of the character key, and further improving security of key management.

Figure 5:
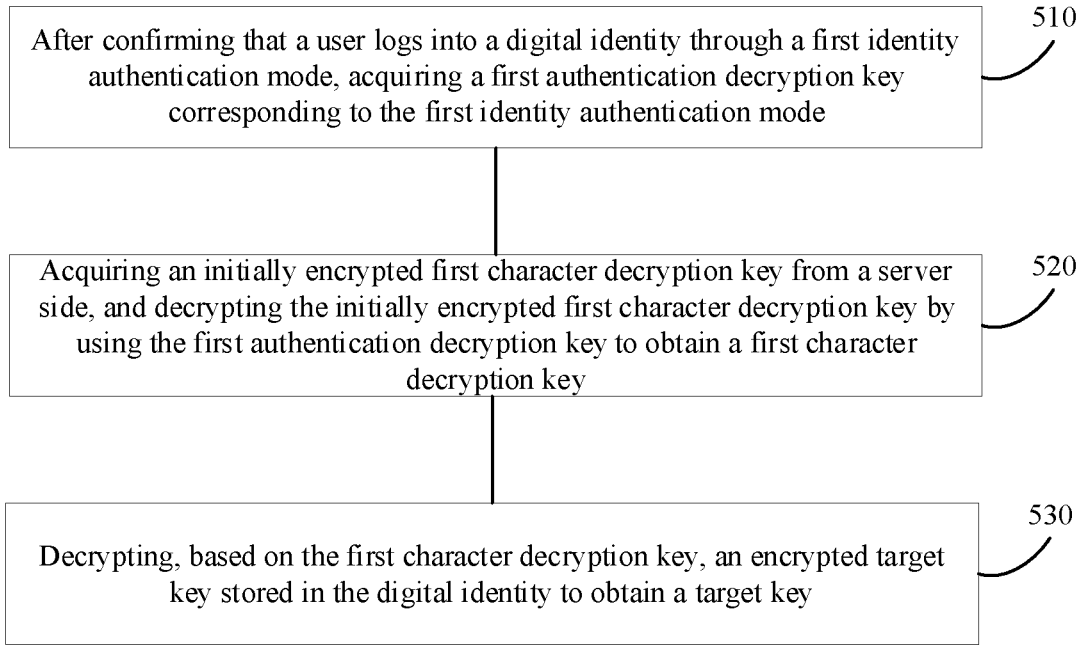
FIG. 5 is a schematic flowchart of a key management method according to another exemplary embodiment of the present application.

FIG. 5 is a schematic flowchart of a key management method according to another exemplary embodiment of the present application. The method may be performed by a client (hereinafter referred to as a login client). As shown in FIG. 5, the method may include the following steps.

S510: after confirming that a user logs into a digital identity through a first identity authentication mode, acquiring a first authentication decryption key corresponding to the first identity authentication mode.

In the embodiment, the first identity authentication mode may correspond to a first authentication encryption key and the first authentication decryption key. For example, the first authentication encryption key may be used to encrypt corresponding data based on management permission of the first identity authentication mode, and the first authentication decryption key may be used to decrypt encrypted data to obtain the data. It should be understood that, the authentication encryption key and the authentication decryption key may be a pair of asymmetric keys, such as a public key and a private key, or may be a symmetric key, which is not limited in the present application.

That the login client may acquire the first authentication decryption key corresponding to the first identity authentication mode after confirming that the user logs into the digital identity through the first identity authentication mode may specifically include: acquiring an encrypted first authentication decryption key from a server side; acquiring a third storage key; and decrypting the encrypted first authentication decryption key by using the third storage key to obtain the first authentication decryption key.

A manner of acquiring the third storage key may include: acquiring first identity authentication information through the first identity authentication mode, where the first identity authentication information is non-public information; and calculating the third storage key based on the first identity authentication information.

In an embodiment, the encrypted first authentication decryption key may be saved in a key database on the server side. Herein, the step of acquiring the encrypted first authentication decryption key from the server side may include: acquiring a first login account number and a first login password based on the first identity authentication mode, where the first login account number corresponds to the first identity authentication mode, and the first login password corresponds to the first login account number; logging into the key database by using the first login account number and the first login password; and acquiring the encrypted first authentication decryption key from the key database.

Optionally, the login client may establish a secure connection with the server side before acquiring the encrypted first authentication decryption key from the server side. For example, the login client may establish the secure connection with the server side through a relatively high-security means such as a private key negotiation algorithm, so as to ensure data security during communication.

It should be understood that, in the embodiments, a manner that the login client acquires the first authentication decryption key is similar to a manner of acquiring the first authentication decryption key in the embodiment illustrated in FIG. 3, and details are not described herein again.

S520: acquiring an initially encrypted first character decryption key from the server side, and decrypting the initially encrypted first character decryption key by using the first authentication decryption key to obtain the first character decryption key.

After confirming that the user logs into the digital identity through the first identity authentication mode, the login client may acquire the initially encrypted first character decryption key corresponding to the first identity authentication mode from the server side, and decrypt the initially encrypted first character decryption key by using the first authentication decryption key to obtain the first character decryption key. The first authentication encryption key and the first authentication decryption key may be generated by a creation client during creation of the first identity authentication mode and be encrypted and saved on the server side.

S530: decrypting, based on the first character decryption key, an encrypted target key stored in the digital identity to obtain a target key.

It should be understood that, a major difference between this embodiment and the embodiments illustrated in FIG. 3 lies in that:

the steps illustrated in FIG. 3 may be performed before a user logs into the digital identity on a new electronic device by using the first identity authentication mode for the first time, and are used to implement binding the first identity authentication mode to the electronic device, encrypting a character decryption key, and saving the encrypted character decryption key locally, so that the login client may acquire the character decryption key locally during routine login of the user, without frequent communication with the server side; and in this embodiment, each time when the user logs into the digital identity through the first identity authentication mode, the login client may acquire the encrypted character decryption key from the server side, and decrypt the encrypted character decryption key in a manner similar to the steps illustrated in FIG. 3 to obtain the character decryption key, and then acquire the target key of the digital identity.

In other words, compared with that in the foregoing embodiments, in this embodiment, zero-knowledge encryption is performed on all data and then the encrypted data is saved on the server side, so that risks of data loss can be avoided to a great extent on the premise of ensuring security of a key, and a good basis is also provided for services such as loss reporting, freezing, and resetting in emergency.

Exemplary Apparatus

Figure 6:
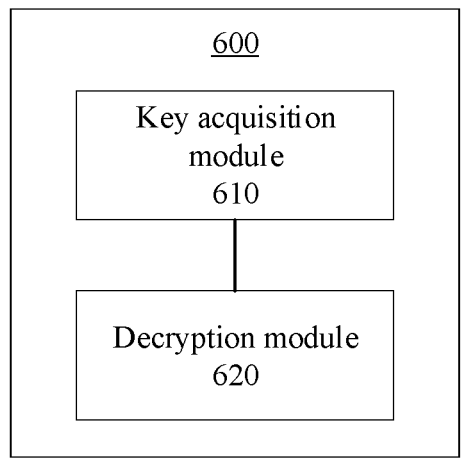
FIG. 6 is a schematic diagram of a key management apparatus according to an exemplary embodiment of the present application.

FIG. 6 is a schematic diagram of a key management apparatus 600 according to an exemplary embodiment of the present application. For example, the apparatus may be an electronic device 12 in a key management system. As shown in FIG. 6, the apparatus 600 may include: a key acquisition module 610, configured to: after confirming that a user logs into a digital identity through a first identity authentication mode, acquire a first character decryption key corresponding to a first character in at least one character of the digital identity; and a decryption module 620, configured to decrypt, based on the first character decryption key, an encrypted target key stored in the digital identity to obtain a target key, where the target key is used to manage an asset corresponding to the first character.

Specifically, a user may have at least one identity authentication mode having permission to log into the digital identity. A digital identity may be associated with only one identity authentication mode, or may be associated with a plurality of identity authentication modes. The plurality of identity authentication modes may correspond to a same user, or may correspond to a plurality of different users. The digital identity corresponds to a natural person, a virtual identity, or an organization.

The identity authentication mode having permission to log into the digital identity may be a mode of authenticating an identity of a user through at least one piece of existing information corresponding to the user. The existing information of the user may include all existing identity authentication modes held by the user.

In another embodiment, a user may have permission to log into a plurality of digital identities, and then may manage assets that are corresponding to the plurality of digital identities.

When a user has permission to log into a plurality of digital identities, at least one identity authentication mode of the user may be set to be corresponding to the plurality of digital identities. In other words, the user may log into the plurality of digital identities through the at least one identity authentication mode.

After confirming that the user logs into the digital identity, the key acquisition module may acquire the first character decryption key corresponding to the first character of the digital identity. Specifically, when it is confirmed that the user is a user having login permission, the key acquisition module may acquire the first character decryption key of the digital identity based on information of the user.

Specifically, the digital identity may have at least one asset, such as a digital currency account, and accounts of various login modes. Each asset has at least one corresponding target key, and the at least one target key is used to manage the asset, for example, may represent ownership, a use right, a viewing right, or another right to the asset.

In addition, a digital identity may include at least one character, and the at least one character includes a first character. The at least one character is used to manage an asset held by the digital identity, and different characters correspond to different assets of the digital identity.

Based on the key management apparatus provided in the embodiments of the present application, different characters are set in a digital identity, and different asset management permissions are assigned to different characters, so that assets can be divided according to a user's needs or a security level to improve convenience of a key management system, and the user can manage the assets more conveniently.

Further, the at least one character each has a corresponding character key, and the character key may include a pair of character encryption key and character decryption key that are corresponding to each other. It should be understood that, the character encryption key and the character decryption key may be a pair of asymmetric keys, such as a public key and a private key, or may be a symmetric key, which is not limited in the present application.

Preferably, in another embodiment, after obtaining the target key, the key management apparatus 600 may further implement, by using the target key and according to an instruction from a user, management of an asset corresponding to the target key.

Based on the key management apparatus provided in the embodiments of the present application, a user can log into a digital identity through existing identity information and implement asset management without memorizing a cumbersome and complicated key, which provides great convenience for the user. In addition, the key management apparatus provided in the embodiments of the present application eliminates risks of key leakage or loss, so that the user does not need to worry whether a key keeping manner is secure, and asset security of the user can be guaranteed to a great extent.

In an embodiment, the digital identity may further include a plurality of permission levels, and each permission level in the plurality of permission levels has permission to manage an asset corresponding to at least one character in the plurality of characters. Specifically, each identity authentication mode in all identity authentication modes that are corresponding to a digital identity has a permission level, and thus has asset management permission of at least one character corresponding to the permission level.

In an embodiment, the key acquisition module may specifically include: a local acquisition unit, configured to acquire a first storage key; and a local decryption unit, configured to acquire an encrypted first character decryption key locally, and decrypt the encrypted first character decryption key based on the first storage key to obtain a first character decryption key.

Specifically, in an embodiment, the local acquisition unit may acquire first identity authentication information through the first identity authentication mode, and calculate the first storage key based on the first identity authentication information. For example, a first salt value may be acquired locally, and the first storage key may be calculated based on the first identity authentication information and the first salt value. The first identity authentication information is non-public information.

Preferably, in another embodiment, to further reduce a risk that the first character decryption key is stolen, the first storage key may be further saved locally in an encrypted form after being encrypted by a second storage key. Herein, the local acquisition unit may first acquire the second storage key, further acquire the encrypted first storage key locally, and decrypt the encrypted first storage key based on the second storage key to obtain the first storage key.

It should be understood that, for convenience and brevity of description, for a specific working scenario, processes, effects and other details of describing the key management apparatus 600 and modules and units therein, reference may be made to the corresponding content in the method embodiments illustrated in FIG. 2, which will not be further described herein.

Figure 7:
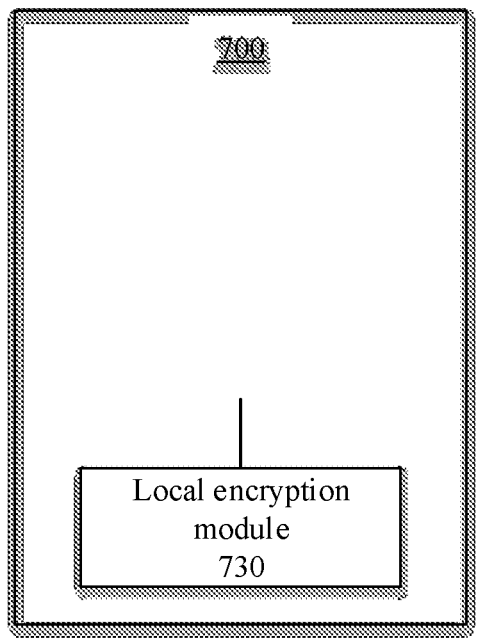
FIG. 7 is a schematic diagram of a key management apparatus according to another exemplary embodiment of the present application.

FIG. 7 is a schematic diagram of a key management apparatus 700 according to another exemplary embodiment of the present application. For example, the apparatus may be an electronic device 12 in a key management system. As shown in FIG. 7, the apparatus 700 may include: a communication acquisition module 710, configured to acquire an initially encrypted first character decryption key from a server side; a communication decryption module 720, configured to acquire a first authentication decryption key, and decrypt the initially encrypted first character decryption key by using the first authentication decryption key to obtain a first character decryption key, where the first authentication decryption key corresponds to a first identity authentication mode; and a local encryption module 730, configured to generate a first storage key, encrypt the first character decryption key by using the first storage key to obtain an encrypted first character decryption key, and save the encrypted first character decryption key locally.

The communication decryption module 720 specifically includes: an acquisition unit, configured to acquire an encrypted first authentication decryption key from the server side; and a decryption unit, configured to acquire a third storage key through the first identity authentication mode, decrypt the encrypted first authentication decryption key by using the third storage key to obtain the first authentication decryption key.

Specifically, to reduce a leakage risk of the third storage key, the third storage key may be generated based on the first identity authentication mode, or the third storage key may be associated with the first identity authentication mode and then saved, so that the decryption unit can acquire the third storage key only when a user logs into a digital identity through the first identity authentication mode. Herein, manners of generating the third storage key by the decryption unit may be different depending on a type of the first identity authentication mode. Correspondingly, manners of acquiring the third storage key by the decryption unit may also be different depending on a generation manner.

In another embodiment, the local encryption module 730 is further configured to generate a second storage key, and encrypt the first storage key by using the second storage key to obtain an encrypted first storage key and save the encrypted first storage key locally.

Based on the key management apparatus provided in the embodiments of the present application, an identity authentication mode specified by a user is bound locally, and multiple encryption is performed on a character key, thereby optimizing a storage manner of the character key, and further improving security of key management.

It should be understood that, for convenience and brevity of description, for a specific working scenario, processes, effects and other details of describing the key management apparatus 700 and modules and units therein, reference may be made to the corresponding content in the method embodiments illustrated in FIG. 3, which will not be further described herein.

Figure 8:
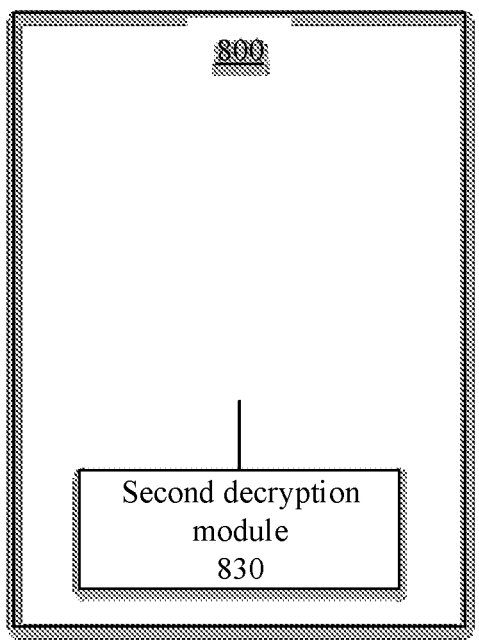
FIG. 8 is a schematic diagram of a key management apparatus according to another exemplary embodiment of the present application.

FIG. 8 is a schematic diagram of a key management apparatus 800 according to another exemplary embodiment of the present application. For example, the apparatus may be an electronic device 12 in a key management system. As shown in FIG. 8, the apparatus 800 may include: a key acquisition module 810, configured to acquire a first authentication decryption key corresponding to a first identity authentication mode after confirming that a user logs into a digital identity through the first identity authentication mode; a first decryption module 820, configured to: acquire an initially encrypted first character decryption key from a server side, decrypt the initially encrypted first character decryption key by using the first authentication decryption key to obtain a first character decryption key, where the first character decryption key is corresponding to a first character in at least one character of the digital identity; and a second decryption module 830, configured to decrypt, based on the first character decryption key, an encrypted target key stored in the digital identity to obtain a target key, where the target key is used to manage an asset corresponding to the first character.

In another embodiment, the key acquisition module 810 may specifically include: an acquisition unit, configured to acquire an encrypted first authentication decryption key from the server side; a calculation unit, configured to acquire a third storage key; and a decryption unit, configured to decrypt the encrypted first authentication decryption key by using the third storage key to obtain the first authentication decryption key.

It should be understood that, for convenience and brevity of description, for a specific working scenario, processes, effects and other details of describing the key management apparatus 800 and modules and units therein, reference may be made to the corresponding content in the method embodiments illustrated in FIG. 5, which will not be further described herein.

Figure 9:
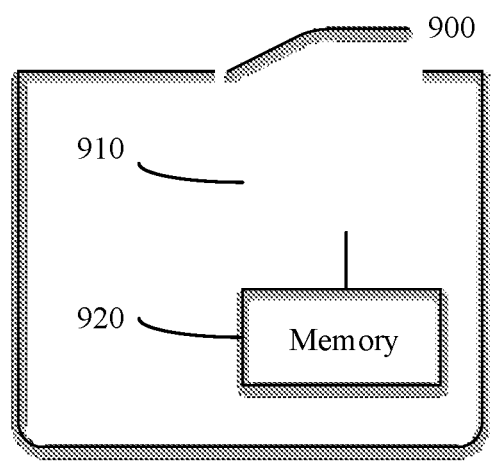
FIG. 9 is a block diagram of an electronic device according to an exemplary embodiment of the present application.

FIG. 9 is a block diagram of an electronic device 900 according to an exemplary embodiment of the present application. Referring to FIG. 9, the electronic device 900 includes a processor 910, and a memory resource represented by a memory 920 for storing computer instructions executable by the processor 910, such as an application program. The application program stored in the memory 920 may include one or more modules each corresponding to a set of instructions. In addition, the processor 910 is configured to execute instructions to perform the foregoing key management method.

The electronic device 900 may further include: a power supply component, configured to perform power management of the electronic device 900; a wired or wireless network interface, configured to connect the electronic device 900 to a network; and an input/output (I/O) interface. The electronic device 900 may be operated based on an operating system, for example, Windows Server™, Mac OS X™, Unix™, Linux™, or FreeBSD™, stored in the memory 920.

A computer-readable storage medium is provided, including computer instructions stored thereon. When the computer instructions in the storage medium are executed by the processor of the electronic device 900, the electronic device 900 can perform a key management method. The key management method includes: after confirming that a user logs into a digital identity through a first identity authentication mode, acquiring a first character decryption key corresponding to a first character in at least one character of the digital identity; and decrypting, based on the first character decryption key, an encrypted target key stored in the digital identity to obtain a target key, where the target key is used to manage an asset corresponding to the first character.

All of the foregoing optional technical solutions may be randomly combined to form an optional embodiment of the present application, and details are not described herein.

Persons of ordinary skill in the art may be aware that, units and algorithm steps in examples described in combination with the embodiments disclosed in this specification can be implemented by electronic hardware or a combination of computer software and electronic hardware. Whether the functions are performed by hardware or software depends on particular applications and design constraints of the technical solutions. A person skilled in the art may use different methods to implement the described functions for each specific application, but it should not be considered that the implementation goes beyond the scope of the present application.

In several embodiments provided in the present application, it should be understood that, the disclosed system, apparatus, and method may be implemented in other manners. For example, the described apparatus embodiments are merely examples. For example, the module and unit divisions are merely logical function divisions and may be other division in actual implementation. For example, a plurality of modules and units may be combined or integrated into another system, or some features may be ignored or not performed. In addition, the displayed or discussed mutual couplings or direct couplings or communication connections may be implemented by using some interfaces. The indirect couplings or communication connections between the apparatus or units may be implemented in electronic, mechanical, or other forms.

The units described as separate components may be or may not be physically separated, and the components displayed as units may be or may not be physical units, that is, may be located in one place or distributed on a plurality of network units. Some or all of the units may be selected according to actual needs to achieve the objective of the solutions of the embodiments.

In addition, function units in the embodiments of the present application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of the present application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present application. The foregoing storage medium includes: various media that may store program check codes, such as a USB flash disk, a mobile hard disk, a Read-Only Memory (ROM), a Random Access Memory (RAM), a magnetic disk, or an optical disk.

It should be noted that, in the description of the present application, the terms "first", "second", "third", and the like are merely intended for a purpose of description, and shall not be understood as an indication or implication of relative importance. In addition, in the descriptions of the present application, unless otherwise stated, "a plurality of" means at least two.

The foregoing descriptions are merely preferable embodiments of the present application, but are not intended to limit the present application. Any modification, equivalent replacement, and the like made without departing from the spirit and principle of the present application shall fall within the protection scope of the present application.

What is claimed is:

1. A key management method, comprising:
   after confirming that a user logs into a digital identity through a first identity authentication mode, acquiring a first character decryption key corresponding to a first character in at least one character of the digital identity; and decrypting, based on the first character decryption key, an encrypted target key stored in the digital identity to obtain a target key, wherein the target key is used to manage an asset corresponding to the first character,
wherein the acquiring a first character decryption key corresponding to a first character in at least one character of the digital identity comprises:
acquiring a first authentication decryption key corresponding to the first identity authentication mode; and
acquiring an initially encrypted first character decryption key from a server side, and decrypting the initially encrypted first character decryption key by using the first authentication decryption key to obtain the first character decryption key, wherein the first authentication decryption key is generated by an electronic device during creation of the first identity authentication mode.

2. The key management method according to claim 1, wherein the first identity authentication mode is one of at least one identity authentication mode having permission to log into the digital identity, and the at least one identity authentication mode comprises at least one of a third-party platform account held by the user, a terminal system account, a mobile phone number account, an identity authentication chip, a digital certificate, a proprietary storage space account, a key, and a password that are held by the user, and a human biological feature of the user.

3. The key management method according to claim 1, wherein the first identity authentication mode corresponds to a plurality of digital identities.

4. The key management method according to claim 1, wherein different characters in the at least one character correspond to different assets, the at least one character comprises a plurality of characters, the digital identity comprises a plurality of permission levels, and each of the plurality of permission levels has permission to manage an asset corresponding to at least one of the plurality of characters; and
the first identity authentication mode corresponds to a first permission level in the plurality of permission levels, and the first permission level has permission to manage the asset corresponding to the first character.

5. The key management method according to claim 1, wherein the digital identity corresponds to a natural person, a virtual identity, or an organization.

6. The key management method according to claim 1, wherein the method further comprises:
acquiring first identity authentication information through the first identity authentication mode, wherein the first identity authentication information is non-public information;
calculating a first storage key based on the first identity authentication information; and
acquiring an encrypted first character decryption key locally, and decrypting, based on the first storage key, the encrypted first character decryption key to obtain the first character decryption key.

7. The key management method according to claim 6, wherein the method further comprises:
generating the first storage key, encrypting the first character decryption key by using the first storage key to obtain the encrypted first character decryption key, and saving the encrypted first character decryption key locally.

8. The key management method according to claim 1, wherein the acquiring a first authentication decryption key corresponding to the first identity authentication mode comprises:
acquiring an encrypted first authentication decryption key from the server side;
acquiring a third storage key; and
decrypting the encrypted first authentication decryption key by using the third storage key to obtain the first authentication decryption key.

9. The key management method according to claim 8, wherein the acquiring a third storage key comprises:
acquiring first identity authentication information through the first identity authentication mode, wherein the first identity authentication information is non-public information; and
calculating the third storage key based on the first identity authentication information.

10. The key management method according to claim 8, wherein the encrypted first authentication decryption key is stored in a key database on the server side, and the acquiring an encrypted first authentication decryption key from the server side comprises:
acquiring a first login account number and a first login password based on the first identity authentication mode, wherein the first login account number corresponds to the first identity authentication mode, and the first login password corresponds to the first login account number;
logging into the key database by using the first login account number and the first login password; and
acquiring the encrypted first authentication decryption key from the key database.

11. An electronic device, comprising:
a processor; and
a memory, comprising computer instructions stored thereon, wherein the computer instructions, when executed by the processor, cause the processor to perform a key management method, the key management method comprising:
after confirming that a user logs into a digital identity through a first identity authentication mode, acquiring a first character decryption key corresponding to a first character in at least one character of the digital identity; and
decrypting, based on the first character decryption key, an encrypted target key stored in the digital identity to obtain a target key, wherein the target key is used to manage an asset corresponding to the first character,
wherein the acquiring a first character decryption key corresponding to a first character in at least one character of the digital identity comprises:
acquiring a first authentication decryption key corresponding to the first identity authentication mode; and
acquiring an initially encrypted first character decryption key from a server side, and decrypting the initially encrypted first character decryption key by using the first authentication decryption key to obtain the first character decryption key, wherein the first authentication decryption key is generated by an electronic device during creation of the first identity authentication mode.

12. The electronic device according to claim 11, wherein the first identity authentication mode is one of at least one identity authentication mode having permission to log into the digital identity, and the at least one identity authentication mode comprises at least one of a third-party platform account held by the user, a terminal system account, a mobile phone number account, an identity authentication chip, a digital certificate, a proprietary storage space account, a key, and a password that are held by the user, and a human biological feature of the user.

13. The electronic device according to claim 11, wherein the first identity authentication mode corresponds to a plurality of digital identities.

14. The electronic device according to claim 11, wherein different characters in the at least one character correspond to different assets, the at least one character comprises a plurality of characters, the digital identity comprises a plurality of permission levels, and each of the plurality of permission levels has permission to manage an asset corresponding to at least one of the plurality of characters; and the first identity authentication mode corresponds to a first permission level in the plurality of permission levels, and the first permission level has permission to manage the asset corresponding to the first character.

15. The electronic device according to claim 11, wherein the digital identity corresponds to a natural person, a virtual identity, or an organization.

16. The electronic device according to claim 11, wherein the key management method further comprises:

acquiring first identity authentication information through the first identity authentication mode, wherein the first identity authentication information is non-public information;

calculating a first storage key based on the first identity authentication information; and acquiring an encrypted first character decryption key locally, and decrypting, based on the first storage key, the encrypted first character decryption key to obtain the first character decryption key.

17. The electronic device according to claim 16, wherein the key management method further comprises:

generating the first storage key, encrypting the first character decryption key by using the first storage key to obtain the encrypted first character decryption key, and saving the encrypted first character decryption key locally.

18. A non-transitory computer-readable storage medium, comprising computer instructions stored thereon, wherein the computer instructions, when executed by a processor, cause the processor to perform a key management method, the key management method comprising:

after confirming that a user logs into a digital identity through a first identity authentication mode, acquiring a first character decryption key corresponding to a first character in at least one character of the digital identity; and decrypting, based on the first character decryption key, an encrypted target key stored in the digital identity to obtain a target key, wherein the target key is used to manage an asset corresponding to the first character, wherein the acquiring a first character decryption key corresponding to a first character in at least one character of the digital identity comprises:

acquiring a first authentication decryption key corresponding to the first identity authentication mode; and acquiring an initially encrypted first character decryption key from a server side, and decrypting the initially encrypted first character decryption key by using the first authentication decryption key to obtain the first character decryption key, wherein the first authentication decryption key is generated by an electronic device during creation of the first identity authentication mode.

* * * * *